US011474885B2

(12) United States Patent
Traver et al.

(10) Patent No.: US 11,474,885 B2
(45) Date of Patent: Oct. 18, 2022

(54) METHOD FOR AN INTERNAL COMMAND OF A FIRST PROCESSING CORE WITH MEMORY SUB-SYSTEM THAT CACHING IDENTIFIERS FOR ACCESS COMMANDS

(71) Applicant: Micron Technology, Inc., Boise, ID (US)

(72) Inventors: John Traver, Boise, ID (US); Jay R. Shoen, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 185 days.

(21) Appl. No.: 16/841,935

(22) Filed: Apr. 7, 2020

(65) Prior Publication Data

US 2021/0311811 A1 Oct. 7, 2021

(51) Int. Cl.
*G06F 9/00* (2006.01)
*G06F 9/54* (2006.01)
*G06F 12/02* (2006.01)
*G06F 12/0871* (2016.01)
*G06F 12/084* (2016.01)
*G06F 9/38* (2018.01)

(52) U.S. Cl.
CPC ............ *G06F 9/544* (2013.01); *G06F 9/3836* (2013.01); *G06F 9/546* (2013.01); *G06F 12/0246* (2013.01); *G06F 12/084* (2013.01); *G06F 12/0871* (2013.01)

(58) Field of Classification Search
CPC ........ G06F 9/544; G06F 9/3836; G06F 9/546; G06F 12/0246; G06F 12/084; G06F 12/0871
See application file for complete search history.

(56) References Cited

U.S. PATENT DOCUMENTS

| 10,083,722 | B2 * | 9/2018 | Oh | G06F 12/0893 |
| 11,126,587 | B2 * | 9/2021 | Brewer | G06F 9/3009 |
| 2007/0226447 | A1 * | 9/2007 | Shimozono | G06F 3/0665 711/170 |
| 2014/0289711 | A1 * | 9/2014 | Usui | G06F 12/084 717/129 |
| 2015/0046661 | A1 * | 2/2015 | Gathala | G06F 9/544 711/147 |
| 2016/0170886 | A1 * | 6/2016 | Ma | G06F 12/084 711/122 |
| 2020/0218455 | A1 * | 7/2020 | Cho | G06F 3/0659 |

* cited by examiner

*Primary Examiner* — Tammara R Peyton
(74) *Attorney, Agent, or Firm* — Holland & Hart LLP

(57) ABSTRACT

Methods, systems, and devices for caching identifiers for access commands are described. A memory sub-system can receive an access command to perform an access operation on a transfer unit of the memory sub-system. The memory sub-system can store an identifier associated with the access command in a memory component and can generate an internal command using a first core of the memory sub-system. In some embodiments, the memory sub-system can store the identifier in a shared memory that is accessible by the first core and can issue the internal command to perform the access operation on the memory sub-system.

20 Claims, 5 Drawing Sheets

METHOD FOR AN INTERNAL COMMAND OF A FIRST PROCESSING CORE WITH MEMORY SUB-SYSTEM THAT CACHING IDENTIFIERS FOR ACCESS COMMANDS

TECHNICAL FIELD

The following relates generally to a memory sub-system and more specifically to caching identifiers for access commands.

BACKGROUND

A memory sub-system can be a storage device, a memory module, and a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
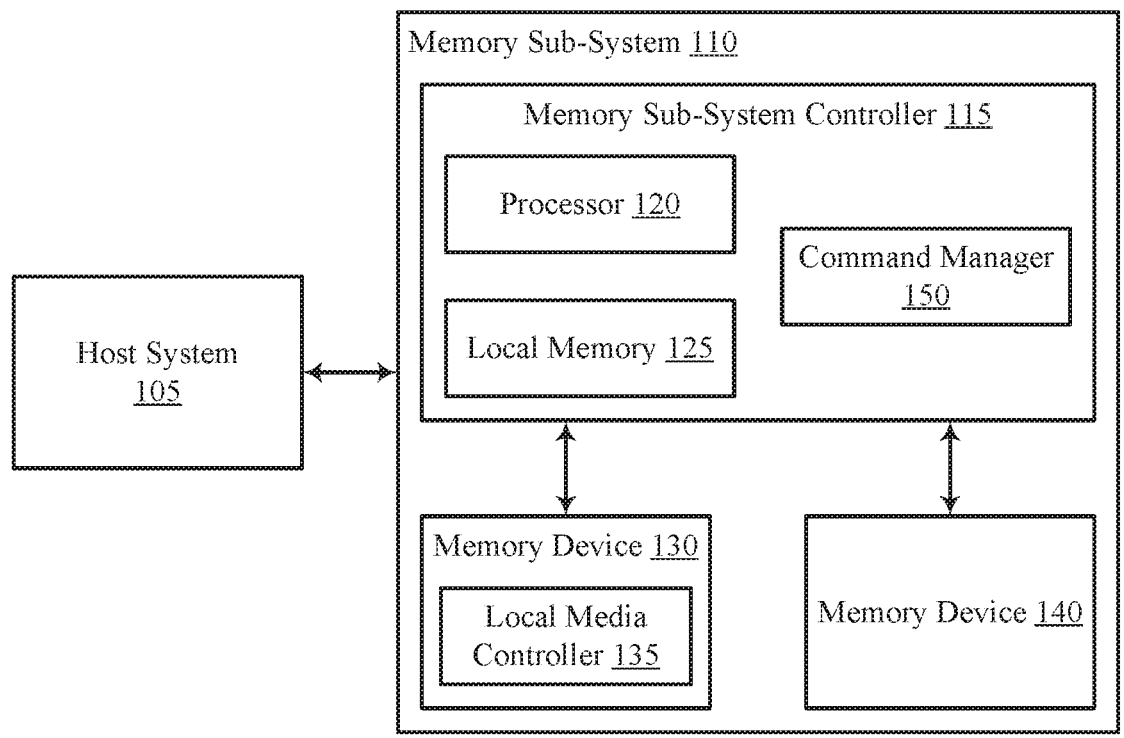
FIG. 1 illustrates an example of a computing system that includes a memory sub-system in accordance with some embodiments of the present disclosure.

Aspects of the present disclosure are directed to caching identifiers for access operations. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A data block hereinafter refers to a unit of the memory device used to store data and can include a group of memory cells, a word line group, a word line, or individual memory cells.

Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time. Multiple blocks can be included in a single plane, and multiple planes can be included in a memory die (e.g., a LUN). In some memory sub-systems, a logical block can be associated with one or more hardware blocks and can correspond to a smallest size of a host transfer unit (TU), where a TU can include one or more logical blocks. Logical blocks can be addressed by a logical block address (LBA).

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

In traditional access operations of memory cells, such as negative-and (NAND) memory cells (e.g., NAND flash memory cells), commands can be transmitted from the host system to various memory dies. The commands can be associated with different access operations (e.g., read operations, write operations, etc.) to be performed on one or more transfer units (TUs). A TU can refer to a portion of data (e.g., 4 k of data) that can be accessed (e.g., written or read) in a memory device (e.g., a NAND device) at one time. A TU can include one or more logical block addresses (LBAs). Each LBA may refer to a portion of data that can be written by the host system at one time. Each LBA can be associated with a unique identifier. In some embodiments, the unique identifier can be referred to as a system tag (e.g., a systag), which can identify the particular LBA associated with an access operation. The host system can transmit a command (e.g., a write command) to write one or more LBAs of a TU.

In a traditional access operation, individual processing cores could be used to process access commands. Each processing core could include its own memory (e.g., tightly coupled memory or closely coupled memory) that could store the systag(s) associated with the received access commands. Each core could perform access operations associated with the systag(s) stored in the respective memory. However, in a traditional access operation, each processing core operated independent of other cores. That is, each core could only process access commands associated with the systags stored in its respective memory and the cores could not aid other cores experiencing backlog in processing access commands. Accordingly, processing access commands on a core-by-core basis could result in increased latency when performing an access operation on one or more memory cells because any one of the cores could become overburdened.

Aspects of the present disclosure address the above and other deficiencies by utilizing an internal command, which can be configured to initiate an access operation on the memory sub-system. For example, the memory-sub system can include memory devices shared between the processing cores (e.g., the frontend processing cores, first processing cores). Accordingly, when an access command is received, an internal command that includes a systag associated with the access command can be generated. In some embodiments, the internal command can also include additional information that facilitates the access operation on the particular memory cell(s). When an internal command is issued, the associated access operation can be performed by one or more second (e.g., backend) processing cores.

In some embodiments, the systag associated with the received access command can be stored to the shared memory such that it is accessible by each of the first cores (e.g., frontend cores). By storing the systag to the shared memory, the internal command associated with the access operation (e.g., associated with the systag of the access operation) can be issued by any of the first cores. The memory shared by the first cores can allow for each of the cores communicate together in order to most-effectively issue the internal commands. For example, any of the first cores can issue an internal command based on its respective availability, which can reduce backlog in performing access operations on the memory sub-system. Later, any first core can perform other aspects of the internal command by accessing the shared memory. Additionally or alternatively, facilitating using multiple cores to perform access operations can reduce latency in performing access operations and increase the overall processing capabilities of the memory sub-system.

Features of the disclosure are initially described in the context of a computing environment as described with reference to FIG. 1. Features of the disclosure are described in the context of flow diagrams and block diagrams as described with reference to FIGS. 2-4. These and other features of the disclosure are further illustrated by and described with reference to a computer system that relates to caching identifiers for access operations as described with reference to FIG. 5.

FIG. 1 illustrates an example of a computing system 100 that includes a memory sub-system in accordance with some embodiments of the present disclosure. The memory sub-system 110 can include media, such as one or more non-volatile memory devices (e.g., memory device(s) 130), one or more volatile memory devices (e.g., memory device(s) 140), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some embodiments, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, USB interface, Fiber Channel, Small Computer System Interface (SCSI), Serial Attached SCSI (SAS), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize a non-volatile memory Express (NVMe) interface to access components (e.g., memory device(s) 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 105 can access multiple memory sub-systems via a same communication connection, multiple separate communication connections, and/or a combination of communication connections.

The memory devices can include any combination of the different types of non-volatile memory devices and/or volatile memory devices. The volatile memory devices (e.g., memory device(s) 140) can be, but are not limited to, random access memory (RAM), such as dynamic RAM (DRAM) and synchronous DRAM (SDRAM).

Some examples of non-volatile memory devices (e.g., memory device(s) 130) includes a negative-and (NAND) type flash memory and write-in-place memory, such as three-dimensional cross-point ("3D cross-point") memory, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell.

In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric RAM (FeRAM), magneto RAM (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination of such. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some embodiments, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 and/or the memory device 140 as well as convert responses associated with the memory devices 130 and/or the memory device 140 into information for the host system 105.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a command manager 150 that can handle communications between the memory sub-system 110 and the host system 105. Some memory sub-systems 110 can include more than one processing core to perform operations. For example, the memory sub-system 110 can include a first processing core to generate internal commands and store systags associated with the internal commands in one or more shared memory devices (e.g., memory shared between each of the first cores). Each of the first cores can access the shared memory and can be configured to issue internal commands associated with the stored systags. Issuing an internal command can result in an associated access operation being initiated and, in some examples, the access operation can be performed by one or more second cores.

In some embodiments, the memory sub-system controller 115 includes at least a portion of the command manager 150. For example, the memory sub-system controller 115 can include a processor 120 (e.g., a processing device) configured to execute instructions stored in local memory 125 for performing the operations described herein. In some embodiments, the command manager 150 is part of the host system 105, an application, or an operating system.

To mitigate latency due to performing a large number of operations using the same processing core, the command manager 150 can be configured to dynamically select cores to issue internal commands. For example, the command manager 150 can be configured to select one of the first cores for issuing a first internal command and a different first core for issuing a second internal command. Generating internal commands and issuing the commands using multiple cores can reduce latency in performing access operations and increase the overall processing capabilities of the memory sub-system 110.

Figure 2:
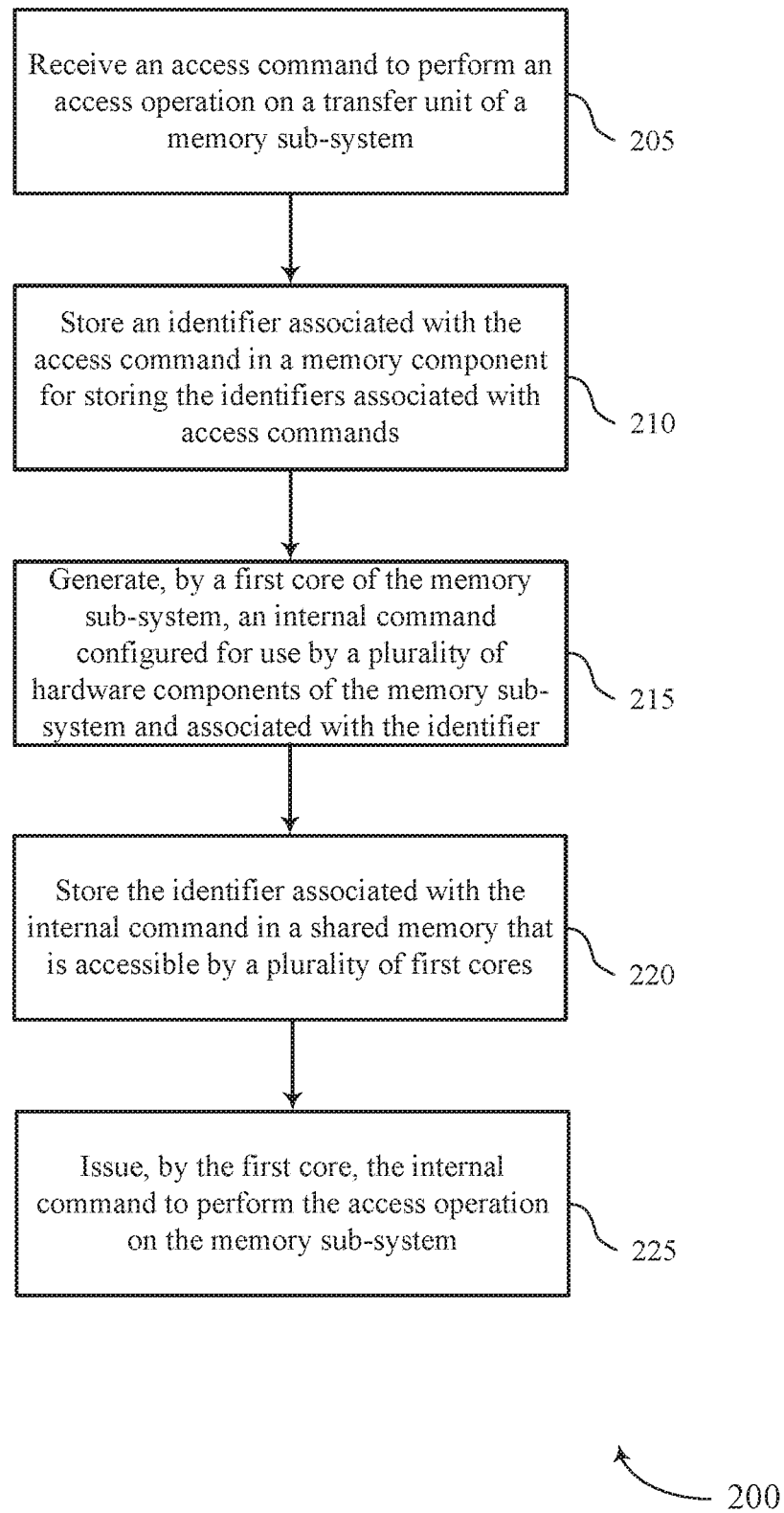
FIG. 2 is a flow diagram of an example method for caching identifiers for access commands in accordance with some embodiments of the present disclosure.

FIG. 2 is a flow diagram of an example method 200 for caching identifiers for access commands in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination of such. In some embodiments, the method 200 is performed by the command manager 150 of FIG. 1. Although shown in a particular sequence or order, unless otherwise specified, the order of the processes can be modified. The illustrated embodiments should be understood only as examples, and the illustrated processes can be performed in a different order, and some processes can be performed in parallel. Additionally, one or more processes can be omitted in various embodiments. Not all processes are required in every example. Other method flows are possible.

At operation 205, the processing logic receives an access command to perform an access operation on a transfer unit of a memory sub-system. The memory sub-system can include multiple first cores and multiple second cores that are different than the first cores. In some embodiments, the second cores are configured to access a memory device for storing data associated with a host system.

At operation 210, the processing logic stores an identifier associated with the access command in a memory component for storing the identifiers associated with access commands. The processing logic can receive an identifier (e.g., a systag) based on performing an access operation on the memory sub-system. The processing logic determines whether the access operation was completed based on receiving the identifier. In some embodiments, the identifier can be received at one of the first cores of the memory sub-system.

At operation 215, the processing logic generates an internal command configured for use by hardware components of the memory sub-system and associated with the identifier. The internal command can be generated by a first core of the memory sub-system. In some embodiments, the processing logic reads a command entry that includes the identifier from a queue. The queue can include multiple command identifiers for performing access operations on the memory sub-system, and the processing logic can read the command entry based on determining that the access operation was not completed. The processing logic can generate the internal command based on reading the command entry.

At operation 220, the processing logic stores the identifier associated with the internal command in a shared memory that is accessible by the first cores. In some embodiments, the processing logic updates the internal command based on reading the command entry to the shared memory.

At operation 225, the processing logic issues the internal command to perform the access operation on the memory sub-system. The command can be issued by the first core.

In some embodiments, the processing logic allocates the identifier to the access command based on receiving the access command. The processing logic can determine that an entry of the shared memory includes the identifier. In some embodiments, the processing logic reads the entry that includes the identifier based on determining that the command entry includes the identifier.

The processing logic can determine whether the identifier matches one or more other identifiers stored in the shared memory. The processing logic can make the determination using a coherency checker, and the determination can be made based on issuing the internal command. In some embodiments, the processing logic updates the identifier associated with the access command based on the identifier matching one or more other identifiers stored in the shared memory. In some embodiments, the access operation associated with the identifier is updated to include the access operation associated with the identifier stored in the shared memory.

In some embodiments, the information of the internal command includes information for performing the access operation on the memory sub-system. Additionally or alternatively, the memory sub-system can include multiple second cores and multiple first cores. The first cores can be different than the first cores, and the second cores can be configured to access a memory device for storing data associated with a host system.

Figure 3:
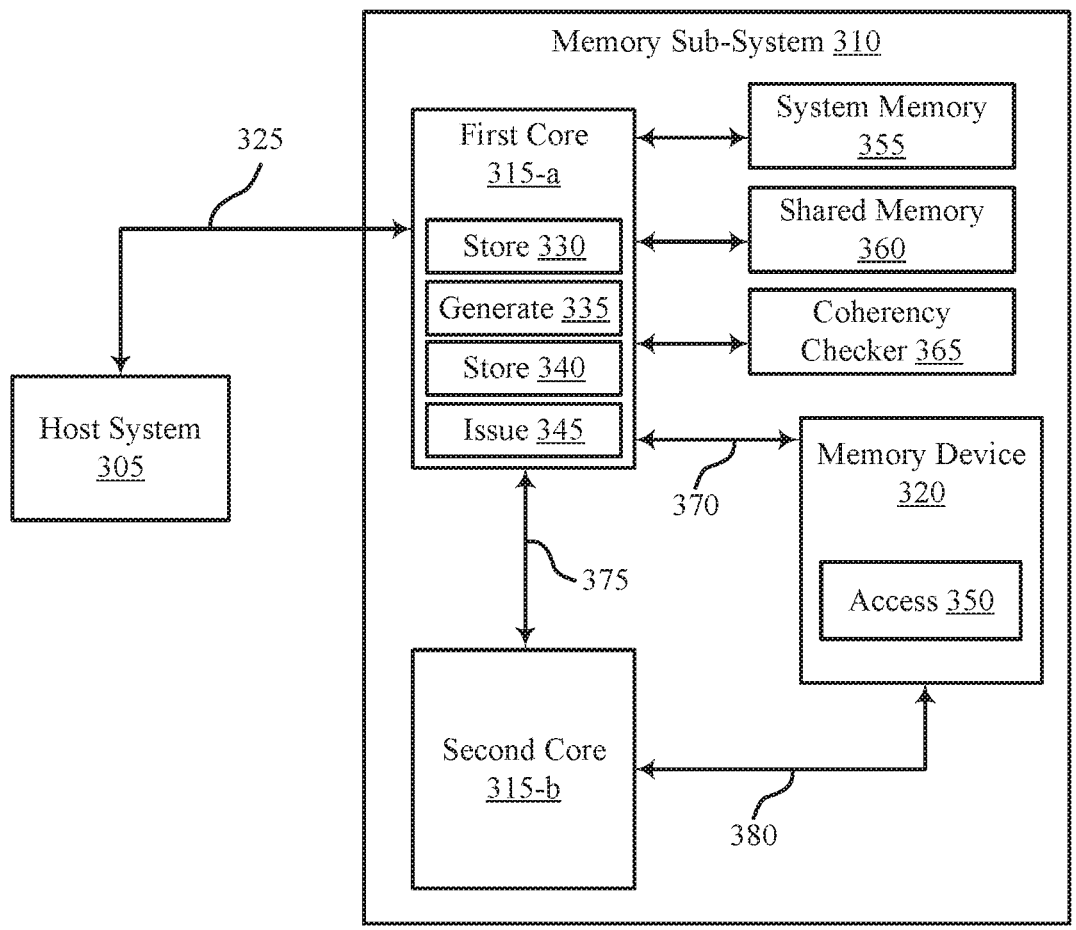
FIG. 3 is a block diagram of an example system for caching identifiers for access commands in accordance with some embodiments of the present disclosure.

FIG. 3 illustrates a block diagram of an example system 300 for caching identifiers for access commands in accordance with some embodiments of the present disclosure. The system 300 can include a host system 305 in communication with a memory sub-system 310. The host system 305 can be an example of the host system 105 described with reference to FIG. 1. The memory sub-system 310 can be an example of the memory sub-system 110 described with reference to FIG. 1. The components of the memory sub-system 310 can receive and transmit communications associated with an access operation (e.g., a read operation and/or a write operation).

In some embodiments, the access operation can be associated with one or more memory cells (e.g., NAND memory cells) of the memory device 320. In order to perform the access operation, different operations can be performed by different processing cores. For example, a portion of the access operation can relate to storing an identifier (e.g., a systag) associated with an access command in the system memory 355 (e.g., the system memory 355). This portion can be performed by the first core 315-*a*. Another portion of the access operation can relate to generating an internal command that is associated with the stored systag, and issuing the internal command to perform the access operation on the memory sub-system 310, which can also be performed by the first core 315-*a*. In some embodiments, an internal command can be or can refer to an L command. The portions of the access operation can be performed by one or more processing cores associated with the various managers and/or devices. Information processed by one or more processing cores associated with the first core manager can be directed to one or more processing cores associated with the second core manager through one or more processing cores associated with a translation manager. Additional details about processing cores of the various manager is described with reference to FIG. 4.

The system 300 can include host system 305 in communication with memory sub-system 310. Memory sub-system 310 can include first core 315-*a*, a second core 315-*b*, and a memory device 320. The first core 315-*a* and the second core 315-*b* of memory sub-system 310 can be examples of processing cores associated with a translation manager of the memory sub-system 310. In some embodiments, the first core 315-*a* can include multiple cores (e.g., four (4) cores) and the second core 315-*b* can include multiple cores (e.g., four (4) cores). The memory sub-system 310 can include firmware that includes a first core manager (e.g., a frontend layer), a translation manager, and a second core manager, each being associated with processing cores.

The host system 305 can issue an access command 325 (e.g., a read command, write command, or other type of command) to retrieve data from memory sub-system 310.

Memory sub-system 310 can receive the access command 325 to retrieve data from the memory device 320 on behalf of the host system 305.

The access command 325 can be received and processed by the first core 315-*a* of the memory sub-system 310. When processing the access command 325, the first core 315-*a* can identify the type of the access command 325 received from the host system 305 or identify one or more parameters of the access command 325.

At operation 330, the first core 315-*a* can store an identifier associated with the received access command. The identifier can be or can be referred to as a systag and can be associated with a TU of the memory device 320. That is, the access command 325 can be associated with one or more memory cells of the memory device 320 and the systag can be associated with a particular TU of the memory device 320 to be accessed. In some embodiments, the systag can be stored to the system memory 355.

The system memory 355 can be a memory device such as, for example, a single-access memory device. In some embodiments, the system memory 355 can be accessible by one or more of the first cores 315-*a*. The systag can be stored to the system memory 355 for use in an access operation (e.g., a subsequent access operation). In some embodiments, the system memory 355 can store multiple systags that are associated with one or more access operations. As discussed below, when an internal command is generated the systag stored in the system memory 355 can be included in the command. That is, the system memory 355 can be accessed in order to generate an internal command for accessing the memory device 320. In some embodiments, it may be beneficial for the systag associated with the internal command to be stored in the shared memory 360 due to the location of the system memory 355. That is, the system memory 355 may be located relatively far from the first core 315-*a* and/or the second core 315-*b*, which would otherwise increase the duration of an access operation.

At operation 335, the first core 315-*a* can generate an internal command for accessing the memory device 320. As described herein, when an access command is received a systag associated with the access command can be stored to the system memory 355. When generating an internal command, the first core 315-*a* can reference the systag stored to the system memory 355. That is, the systags stored in the system memory 355 can be included in an internal command generated by the first core 315-*a*.

The internal command generated by the first core 315-*a* can be used for performing the access operation on the memory device 320. The internal command can include information about the TU associated with the respective systag, such as information related to error correction and/or whether the associated access command was successfully performed. Containing such information in the internal command can allow for the first core 315-*a* to determine whether the associated access operation was successfully performed. That is, the information included in an internal command can allow for the memory sub-system 310 to make certain determinations about an access operation that are related to performance (e.g., whether an access operation was successful), quality (e.g., error handling), and the like.

At operation 340, the first core can store the systag associated with the internal command in the shared memory 360. In some embodiments, the first core 315-*a* can include shared memory 360 that is shared between each of the cores. For example, the first core 315-*a* can include four (4) cores that can each utilize the shared memory 360. The shared memory 360 can be used to store (e.g., temporarily store) the systags that were used to generate associated internal commands. Once an internal command is generated, the identifier associated with the internal command can be stored in the shared memory 360.

In some embodiments, the systag associated with the internal command can remain stored in the shared memory 360 until one or more performance and/or quality determinations are made. For example, if the access operation is unsuccessful, the memory device 320 (and/or the second core 315-*b*) can indicate such to the first core 315-*a*. The first core 315-*a* may receive an indication of the systag and a status of the access operation, and may compare the status with the systag stored in the shared memory 360. By storing the systags in the shared memory 360 that is accessible by the first core 315-*a*, the first core 315-*a* can receive a relatively small message (e.g., an indication of the systag and a status of the access operation), which can improve performance of the memory sub-system.

At operation 345, the first core 315-*a* can issue the internal command to the memory device 320. The internal command can be issued to the memory device 320, for example, via communication channel 370, which can be a two-way communication channel (i.e., the first core 315-*a* can communicate with the memory device 320 and vice versa). When the internal command is received at the memory device 320, the access operation can be performed on the associated TU(s) (e.g., at operation 350). In some embodiments, the access operation can be performed by the second core 315-*b*. The properties of the internal command can be based on a type operation to be performed. For example, the internal command can be associated with an access operation for a single page of data or multiple pages of data (e.g., a multi-plane read or write).

In some embodiments, utilizing the second core 315-*b* to perform the access operation can allow the first core 315-*a* to continue processing incoming access commands, generating internal commands, determining whether access operations are successfully performed, and the like. That is, the internal command can be issued to the second core 315-*b* (e.g., via communication channel 375), and the second core 315-*b* can perform the operation 350 (e.g., the access operation) on the memory device 320. The second core 315-*b* can, in some examples, communicate directly with the memory device 320 via the communication channel 380. Using the second core 315-*b* to perform the operation 350 can improve the overall performance and timing of access operations of the memory sub-system.

In other examples, the memory sub-system 310 can include a coherency checker 365. The coherency checker can, in some examples, communicate with the first core 315-*a* via one or more communication links. The coherency checker can be used to determine whether a systag associated with an access command is stored in the system memory 355. For example, a systag that stored in the system memory 355 and is associated with a particular TU can pertain to a write operation. A subsequent access command can be received that is associated with the same TU but pertains to a read operation. In such an example, the coherency checker 365 can determine that the systags match (e.g., that the received systag matches a systag stored in the system memory 355) and can update the access command associated with the systag stored in the system memory 355.

In other embodiments, one or more systags associated with subsequently received access commands might not match any systags stored in the system memory 355. In such an example, the coherency checker 365 can indicate (e.g., to the first core 315-*a*) that the received systags are not stored in the system memory 355 and that the systags are to be stored. In some embodiments, the coherency checker 365 can communicate directly with the system memory 355 or, in other examples, can communicate with the system memory 355 indirectly via the first core 315-*a*. If communicating with the system memory 355 via the first core 315-*a*, different cores (of the first core 315-*a*) can be utilized to access the system memory 355, update systags stored in the system memory 355, and/or store one or more systags to the system memory 355.

The internal command issued to the memory device 320 can include information for performing the access operation on the memory sub-system.

In some embodiments, after an internal command is issued and a corresponding access operation is performed, the first core 315-*a* can receive an identifier from the memory device 320. The identifier can indicate (e.g., the identifier can identify) the systag associated with the access operation. In some embodiments, the identifier can be issued directly to the first core 315-*a* (e.g., via communication channel 370) or to the first core via the second core 315-*b*. The identifier can include a status of the access operation. That is, the status can indicate whether the access operation was successfully (or unsuccessfully) performed on the TU. The first core 315-*a* can then determine whether the access operation associated with an issued internal command was successful.

To determine the particular TU (and whether the corresponding access operation was successful), the first core 315-*a* can compare the identifier with the systags stored in the system memory 355. If the access operation was successful, the first core 315-*a* can remove (e.g., erase) the systag from the systag memory. However, if the access operation was unsuccessful, the first core 315-*a* can re-issue the associated internal command or correct the error that occurred during the access operation.

When an access operation is unsuccessful, the first core 315-*a* can read a command identifier to the shared memory 360. The command identifier can include the systag associated with the unsuccessful access operation. Accordingly, by reading the command identifier to the shared memory 360, the first core 315-*a* can update (e.g., re-generate) the internal command and issue the updated internal command to the memory device 320. By reissuing the internal command, the first core 315-*a* can correct the error that occurred during the access operation. In some embodiments, the first core 315-*a* and/or the second core 315-*b* can continue respective operations until the error is corrected and the access operation is successfully performed. When the access operation is successfully performed, the first core 315-*a* can indicate such to the host system 305. Utilizing internal commands, as described herein, can reduce backlog in performing access operations on the memory sub-system. Because any first core 315-*a* can perform aspects of the internal command by accessing the shared memory, processing access commands on a core-by-core basis can be eliminated. Instead, multiple cores can be used to perform access operations, which can reduce latency in performing access operations and increase the overall processing capabilities of the memory sub-system.

Figure 4:
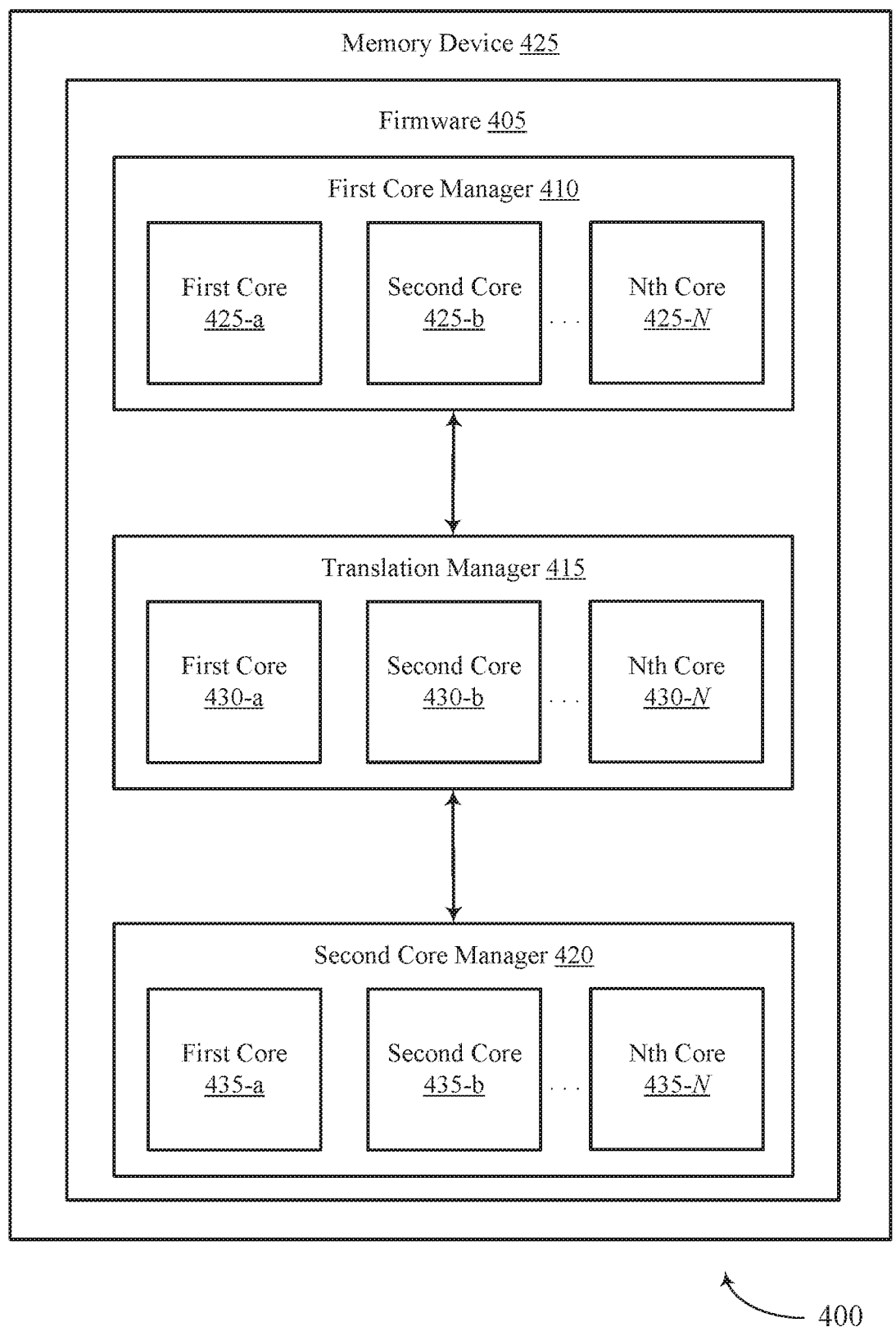
FIG. 4 is a block diagram of an example memory sub-system for caching identifiers for access commands in accordance with some embodiments of the present disclosure.

FIG. 4 illustrates a block diagram of an example memory sub-system 400 for caching identifiers for access commands in accordance with some embodiments of the present disclosure. A memory sub-system can include firmware 405. The firmware 405 can include a first core manager 410 (sometimes referred to as a frontend layer), a translation manager 415 (sometimes referred to as a flash translation layer or FTL), and a second core manager 420 (sometimes referred to as a backend layer). A core may be an example of a processor (e.g., processor 120), one or more portions of a processor, a processing device (e.g., processing device 505), one or more portions of a processing device, or combinations of such, as described herein. A core may be any circuit, processor, hardware, or device configured to execute one or more instructions to perform one or more operations.

First core manager 410 can be configured as an interface between the host system and the memory sub-system. For example, the first core manager 410 can be configured to receive, process, and/or interpret commands and other communications received from the host system and transmitted to the host system. One or more cores 425 can be used to perform the functions of the first core manager 410. For example, a first core 425-*a*, a second core 425-*b*, and an Nth core 425-N can be used to implement the functions of the first core manager 410. In some embodiments, these cores 425 are dedicated to performing the functions of the first core manager 410. In some embodiments, one or more these cores 425 can be used to perform the functions of the first core manager 410, the translation manager 415, or the second core manager 420, or combinations of such. N can represent any positive integer of cores.

Second core manager 420 can be configured as an interface between the memory sub-system and the memory device of the memory sub-system. For example, the second core manager 420 can be configured to receive, process, and/or interpret data and other communications received from the memory device and transmitted to the memory device. One or more cores 435 can be used to perform the functions of the second core manager 420. For example, a first core 435-*a*, a second core 435-*b*, and an Nth core 435-N can be used to implement the functions of the second core manager 420. In some embodiments, these cores 435 are dedicated to performing the functions of the second core manager 420. In some embodiments, one or more these cores 435 can be used to perform the functions of the first core manager 410, the translation manager 415, or the second core manager 420, or combinations of such. N can represent any positive integer of cores.

Translation manager 415 can be configured as an interface between the first core manager 410 and the second core manager 420. In some implementations, the commands and signaling scheme used by the host system can be different than the command and signaling scheme used by the memory device. To facilitate communications between the host system and the memory device that stores data on behalf of the host system, the translation manager 415 can translate or otherwise convert host system information to memory device information and vice-versa. One or more cores 430 can be used to perform the functions of the translation manager 415. For example, a first core 430-*a*, a second core 430-*b*, and an Nth core 430-N can be used to implement the functions of the translation manager 415. In some embodiments, these cores 430 are dedicated to performing the functions of the translation manager 415. In some embodiments, one or more these cores 430 can be used to perform the functions of the translation manager 415, the translation manager 415, or the second core manager 420, or combinations of such. N can represent any positive integer of cores.

The first core 315-*a* and the second core 315-*b* described with reference to FIG. 3 can be examples of the core 425 and core 435 of the first core manager 410 and the second core manager 420, respectively. In such examples, the first core 315-*a* that receives the access command, stores a systag associated with the access command to both the systag memory and the shared memory, and generates and issues the internal command can be any of the Nth cores 425-N. In some instances, the first core 425-*a* of the first core manager 410 can receive the access command, store a systag associated with the access command to both the systag memory and the shared memory, and generate and issue the internal command. The access operation can be performed by one or more cores 430 of the translation manager 415, one or more cores 435 of the second core manager 420, the memory device, or combinations of such. For example, one or more cores 430 and one or more cores 435 can be used to perform an access operation based on a core 425 issuing an internal command. In some embodiments, one or more cores 435 of the second core manager 420 can provide the first core manager 410 an indication of whether the access operation was successfully performed. In the case that the access operation was unsuccessful, the first core manager 410 can re-generate and/or re-issue the internal command.

Figure 5:
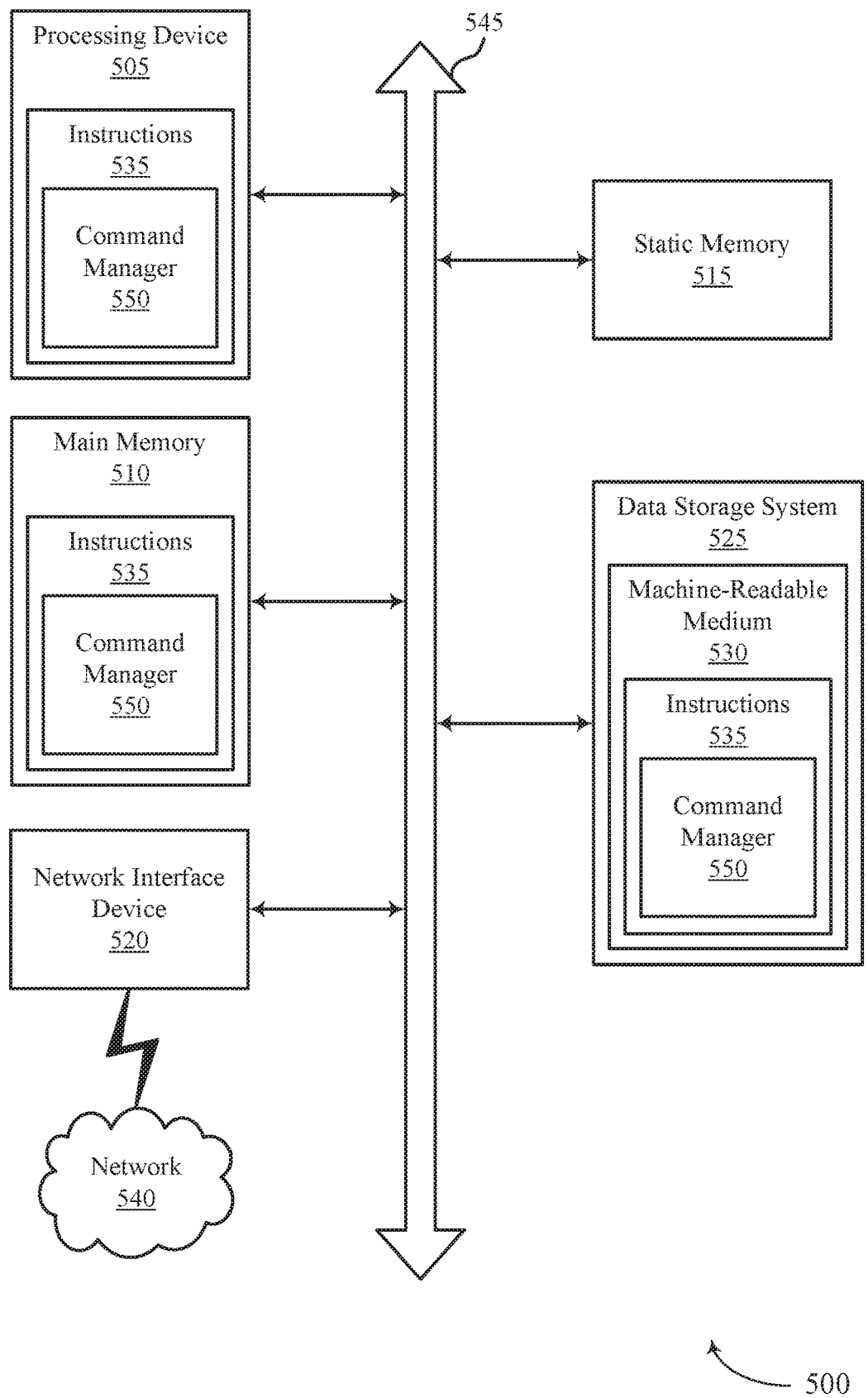
FIG. 5 is a block diagram of an example computer system in which embodiments of the present disclosure can operate.

FIG. 5 illustrates a block diagram of an example computer system 500 in which embodiments of the present disclosure can operate. The computer system 500 can include a set of instructions, for causing the machine to perform any one or more of the techniques described herein. In some embodiments, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the command manager 150 described with reference to FIG. 1). In some embodiments, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., ROM, flash memory, DRAM such as SDRAM or Rambus DRAM (RDRAM), etc.), a static memory 515 (e.g., flash memory, static RAM (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an ASIC, an FPGA, a DSP, network processor, or the like. The processing device 505 is configured to execute instructions 535 for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a command manager 550 (e.g., the command manager 150 described with reference to FIG. 1). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer.

Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method, comprising:
   receiving an access command to perform an access operation on a transfer unit of a memory sub-system;
   storing an identifier associated with the access command in a memory component for storing identifiers associated with access commands;
   generating, by a first core of the memory sub-system, an internal command configured for use by a plurality of hardware components of the memory sub-system and associated with the identifier;
   storing the identifier associated with the internal command in a shared memory that is accessible by a plurality of first cores; and
   issuing, by the first core, the internal command to perform the access operation on the memory sub-system.

2. The method of claim 1, further comprising:
   receiving, at one of the plurality of first cores, the identifier based at least in part on performing the access operation on the memory sub-system; and
   determining whether the access operation was completed based at least in part on receiving the identifier.

3. The method of claim 2, further comprising:
   reading, to the shared memory, a command entry comprising the identifier from a queue comprising a plurality of command identifiers for performing access operations on the memory sub-system based at least in part on determining that the access operation was not completed; and
   updating the internal command based at least in part on reading the command entry to the shared memory.

4. The method of claim 3, further comprising:
   allocating the identifier to the access command based at least in part on receiving the access command;
   determining that an entry of the shared memory comprises the identifier; and
   reading the entry comprising the identifier based at least in part on determining that the command entry comprises the identifier, wherein generating the internal command is based at least in part on reading the command entry.

5. The method of claim 1, further comprising:
   determining, by a coherency checker, whether the identifier matches one or more other identifiers stored in the shared memory based at least in part on issuing the internal command.

6. The method of claim 5, further comprising:
   updating the identifier associated with the access command based at least in part on the identifier matching one or more other identifiers stored in the shared memory, wherein the access operation associated with the identifier is updated to include the access operation associated with the identifier stored in the shared memory.

7. The method of claim 1, wherein the internal command comprises:
   information for performing the access operation on the memory sub-system.

8. The method of claim 1, wherein the memory sub-system comprises a plurality of second cores that are different than the plurality of first cores, wherein the plurality of second cores are configured to access a memory device for storing data associated with a host system.

9. A system, comprising:
   a plurality of memory components; and
   a processing device, operatively coupled with the plurality of memory components, to:
   receive an access command to perform an access operation on a transfer unit of a memory sub-system;
   store an identifier associated with the access command in a memory component for storing identifiers associated with access commands;
   generate, by a first core of the memory sub-system, an internal command configured for use by a plurality of hardware components of the memory sub-system and associated with the identifier;
   store the identifier associated with the internal command in a shared memory that is accessible by a plurality of first cores; and
   issue, by the first core, the internal command to perform the access operation on the memory sub-system.

10. The system of claim 9, further comprising:
    the processing device further to:
    receive, at one of the plurality of first cores, the identifier based at least in part on performing the access operation on the memory sub-system; and
    determine whether the access operation was completed based at least in part on receiving the identifier.

11. The system of claim 10, further comprising:
    the processing device further to:
    read, to the shared memory, a command entry comprising the identifier from a queue comprising a plurality of command identifiers for performing access operations on the memory sub-system based at least in part on determining that the access operation was not completed; and update the internal command based at least in part on reading the command entry to the shared memory.

12. The system of claim 11, further comprising:

the processing device further to:

allocate the identifier to the access command based at least in part on receiving the access command;

determine that an entry of the shared memory comprises the identifier; and read the entry comprising the identifier based at least in part on determining that the command entry comprises the identifier, wherein generating the internal command is based at least in part on reading the command entry.

13. The system of claim 9, further comprising:

the processing device further to:

determine, by a coherency checker, whether the identifier matches one or more other identifiers stored in the shared memory based at least in part on issuing the internal command.

14. The system of claim 13, further comprising:

the processing device further to:

update the identifier associated with the access command based at least in part on the identifier matching one or more other identifiers stored in the shared memory, wherein the access operation associated with the identifier is updated to include the access operation associated with the identifier stored in the shared memory.

15. The system of claim 9, wherein the internal command comprises:

information for performing the access operation on the memory sub-system.

16. The system of claim 9, wherein the memory sub-system comprises a plurality of second cores that are different than the plurality of first cores, wherein the plurality of second cores are configured to access a memory device for storing data associated with a host system.

17. A non-transitory computer-readable storage medium comprising instructions that, when executed by a processing device, cause the processing device to:

receive an access command to perform an access operation on a transfer unit of a memory sub-system;

store an identifier associated with the access command in a memory component for storing identifiers associated with access commands;

generate, by a first core of the memory sub-system, an internal command configured for use by a plurality of hardware components of the memory sub-system and associated with the identifier;

store the identifier associated with the internal command in a shared memory that is accessible by a plurality of first cores; and issue, by the first core, the internal command to perform the access operation on the memory sub-system.

18. The non-transitory computer-readable storage medium of claim 17, the instructions, when executed by the processing device, cause the processing device to:

receive, at one of the plurality of first cores, the identifier based at least in part on performing the access operation on the memory sub-system; and determine whether the access operation was completed based at least in part on receiving the identifier.

19. The non-transitory computer-readable storage medium of claim 18, the instructions, when executed by the processing device, cause the processing device to:

read, to the shared memory, a command entry comprising the identifier from a queue comprising a plurality of command identifiers for performing access operations on the memory sub-system based at least in part on determining that the access operation was not completed; and update the internal command based at least in part on reading the command entry to the shared memory.

20. The non-transitory computer-readable storage medium of claim 17, the instructions, when executed by the processing device, cause the processing device to:

read, to the shared memory, a command entry comprising the identifier from a queue comprising a plurality of command identifiers for performing access operations on the memory sub-system based at least in part on determining that the access operation was not completed; and update the internal command based at least in part on reading the command entry to the shared memory.

* * * * *